United States Patent [19]
Duncan

[11] 3,941,495
[45] Mar. 2, 1976

[54] BALL AND SOCKET JOINT AND METHOD OF MAKING THE SAME

[76] Inventor: Lane Duncan, 221 Hindry Ave., Inglewood, Calif. 90301

[22] Filed: Mar. 14, 1975

[21] Appl. No.: 558,603

[52] U.S. Cl. ............... 403/267; 403/268; 403/269; 264/242; 425/129 R; 403/122
[51] Int. Cl.². B25G 3/34; F16B 11/00; F16B 12/04
[58] Field of Search ........... 403/265, 267, 268, 269, 403/270, 271, 272, 122; 264/242; 249/87; 425/127, 129; 285/294, 297

[56] References Cited
UNITED STATES PATENTS

| | | | |
|---|---|---|---|
| 1,900,617 | 3/1933 | Ricardo | 403/131 X |
| 2,307,874 | 1/1943 | Bilde | 425/127 X |
| 3,023,038 | 2/1962 | White | 403/130 |
| 3,202,749 | 8/1965 | White | 425/129 X |
| 3,591,669 | 7/1971 | Memory | 264/242 X |
| 3,785,217 | 1/1974 | Peura | 264/242 X |

Primary Examiner—Werner H. Schroeder
Assistant Examiner—Wayne L. Shedd
Attorney, Agent, or Firm—Sughrue, Rothwell, Mion, Zinn & Macpeak

[57] ABSTRACT

A ball and socket joint of the type having a plastic ball portion which would interfere with the socket on assembly, has the ball portion molded to an arm concentric with the socket. In making the ball and socket joint, the arm is positioned in a mold and concentrically referenced to the socket. Then the plastic ball portion is molded on the arm using the inside of the socket as the outside spherical surface of the mold. Upon shrinkage of the molded plastic ball, a perfect bearing clearance is obtained, all of the socket inside surface is used as a bearing area and burrs from cuts on the socket to accommodate the interference fit are eliminated.

4 Claims, 5 Drawing Figures 3,941,495

BALL AND SOCKET JOINT AND METHOD OF MAKING THE SAME

BACKGROUND OF THE INVENTION

1. Field of the Invention

This invention relates to improvements in ball and socket joints, particularly in the making of such joints of the type having a ball portion which cannot be assembled within the socket, other than by cutting slots in the socket.

2. Description of the Prior Art

The prior art on which this invention improves is illustrated in FIGS. 1 and 2 of the attached drawing. A ball and socket joint is formed of a ball 10 and a socket 12, the socket being machined on the end of a link 14. An arm 16 is machined to be attachable in a bushing portion 18 of the socket. The link and arm are useful in a number of applications, including actuators on guided missiles. The ball 10 is molded of suitable plastic material and includes a part spherical surface 20 and flat faces 22 as well as the drilled hole forming a bushing portion 18. The link 14 is formed of machinable metal and is drilled and machined to provide a socket hole 24 having a part spherical inner surface 26 matching the spherical surface of the ball 20. The link also has flat faces 28. In order to insert the ball 10 into the socket hole 24, it is further necessary to cut out portions 30 at diametrically opposite portions of the cylindrical surface 26 and of such a diameter that the ball can be turned sideways as shown in FIG. 2 inserted halfway into the socket and turned, in order to allow it to fit. The link 16 is then inserted into the ball placed within the socket, shown in FIG. 1, and secured. In order to have good bearing surfaces, the ball 10 of plastic must itself be machined. A typical plastic used is Delrin acetyl resin.

The disadvantages of the prior art include the fact that there is a burr left on the edges between the cylindrical surfaces 26 and the transverse cuts 30 and 32, and this burr increases friction and can cut into the plastic ball. Additionally, just forming the cuts 30 and 32 (called Messerschmett's in the trade) creates a complicated machining problem. Moreover, the space of the cuts 30 and 32 is space removed from the spherical bearing surface.

SUMMARY OF THE INVENTION

This invention eliminates the disadvantage of the prior art listed above by providing a complete solid spherical surface on the socket and integrally molding the plastic ball to an arm which is held concentric with the socket during the molding so that the inside of the socket furnishes a portion of the mold. On shrinking of the plastic, a perfect clearance is obtained between the outer surface of the ball and the inside surface of the socket. Moreover, because the socket has not been cut by the transverse cuts, as in the prior art, the bearing surface between the ball and socket is increased considerably, machining on the socket is eliminated and burrs created by such machining which ordinarily tear up such precision equipment, are also eliminated.

DETAILED DESCRIPTION OF PREFERRED EMBODIMENTS

Figure 1:
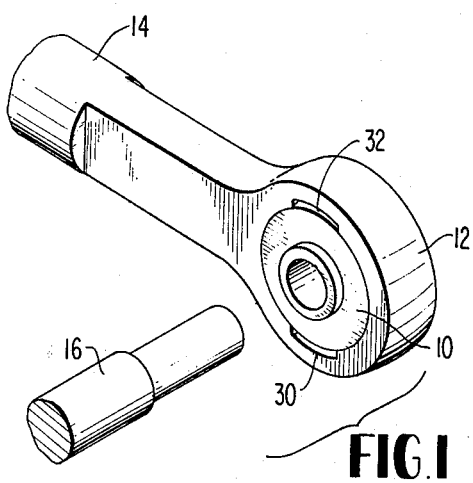
FIG. 1 is a perspective view of a prior art construction of a ball and socket joint, utilizing a machined socket and a separately attached arm for the ball.
Figure 2:
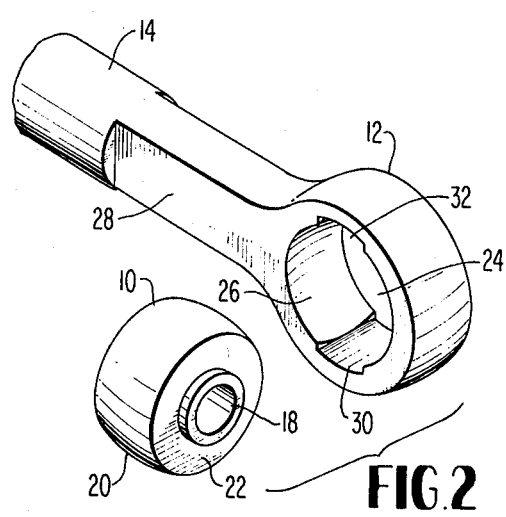
FIG. 2 is an exploded perspective view showing the ball and socket of the prior art in a disassembled condition in order to illustrate how assembly is made.
Figure 3:
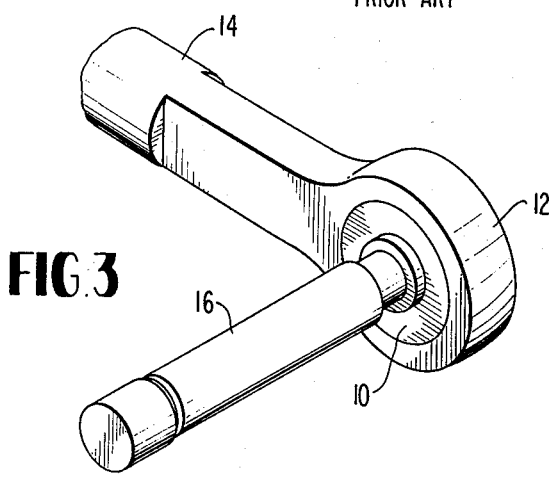
FIG. 3 is a perspective view of the ball and socket joint of this invention.
Figure 4:
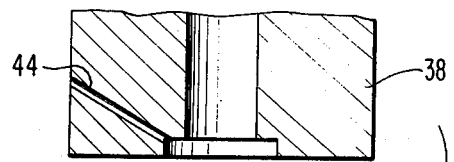
FIG. 4 is an elevation view with the socket and mold shown in section, illustrating the mold and how the ball and socket joint of this invention is made.
Figure 5:
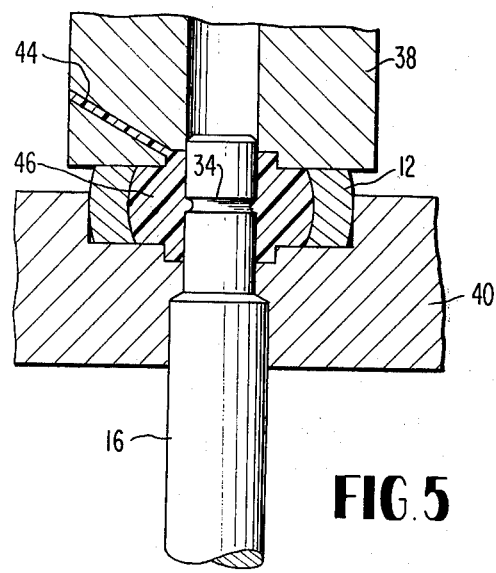
FIG. 5 is a view similar to FIG. 4 showing the mold in position and the molding of the ball onto the linkage arm.

The same reference numerals are used in FIG. 3 and portions of FIG. 4 and FIG. 5 as in the prior art of FIGS. 1 and 2. It can be seen, however, that the socket 12 of this invention does not have the transverse cuts 30 and 32. The socket has pre-machined therein, the bearing surface 26 and the link 16 has a ball retaining groove 34 adjacent its end, so that the plastic ball 10 may be directly molded onto the end of the link.

As shown in FIGS. 4 and 5, a simple plastic mold, consisting of two mold parts 38 and 40, has a bore therethrough for referencing and holding the arm 16. Concentric with the axis of arm 16 there is a blind circular hole for positively referencing and holding the end of socket 12. The inside surface of socket 12 thus functions as one of the mold surfaces and the outside surface of the end of arm 16 functions as another mold surface. Mold parts 38 and 40 provide the other two mold surfaces. Mold part 38 has a hole therein for referencing it on the end of arm 16. Plastic is injection molded through suitable sprue 44 and the plastic material may be an acetyl resin, such as Delrin. After molding, the plastic shrinks so as to further grip the end of the link or arm 16, and create a bearing clearance at the inside surface of the socket 12. This surface will be exactly the same completely around the bearing as the shrinkage will be uniform. The sprue portion is broken off and the ball and socket joint with the link 16 is ready to use.

It can be seen that there is now no burr on the cylindrical surface 16 to tear the bearing, that machining is much simplified, because there is no need to cut the slots 30 and 32, and that the bearing surface is increased by the area of the slots 30 and 32 of the prior art, which is approximately 25 to 30%. There is no need to machine the ball, and in fact, it will have a perfect fit.

The invention has been successful in use in ball and socket joints of high precision nature, such as are used in guided missiles.

I claim:

1. A method of making a ball and socket bearing joint of dimensions such that the ball cannot be assembled within the socket without interfering with a portion of the socket, the method comprising: positioning a complete bearing socket having a link portion and a bushing portion having a socket hole with a continuous inner part spherical surface in a mold and supporting the socket so that the inside surface of the socket can function as an outer wall of a mold for the ball, supporting a ball support in the mold so that it is concentric within the socket, the mold defining the edges of cavity having its outer surface defined by the part spherical surface of the socket bushing and an inner surface defined by the ball support and molding a plastic resin which shrinks upon setting within the mold and socket inner surface on the ball support to form the entire ball, the shrinking of the plastic resin providing a uniform bearing clearance between the socket and the ball.

2. A method as in claim 1 wherein a single mold part concentrically aligns, holds, supports the socket and ball support.

3. A method as is claim 2 wherein the ball support is an arm molded integrally into the center of the ball.

4. A pushrod having a ball and socket bearing joint of the type having a rotatable ball with a center passage for an arm, a socket with a part spherical inner surface therein, and of dimensions such that the ball cannot be assembled within the socket without interfering with the socket inner surface, comprising: a metallic socket having a link portion and a bushing portion having a socket hole of part spherical shape with a continuous machined inner surface, a rotatable plastic ball molded entirely of plastic resin which shrinks upon setting in situ within the continuous machined inner surface, to create a bearing clearance therebetween upon shrinking of the plastic.

* * * * *